Figure 1:
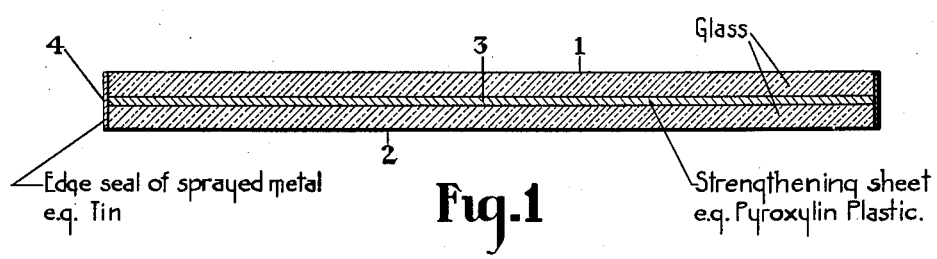

Feb. 16, 1932.  F. B. DAVIS, JR  1,845,133

EDGE SEALED ASSEMBLY

Filed June 16, 1928

Edge seal of sprayed metal e.g. Tin

Glass

Strengthening sheet e.q. Pyroxylin Plastic.

Francis B. Davis Jr. Inventor

By his attorney

Patented Feb. 16, 1932

1,845,133

UNITED STATES PATENT OFFICE

FRANCIS B. DAVIS, JR., OF CHRISTIANA HUNDRED, DELAWARE, ASSIGNOR TO DU PONT VISCOLOID COMPANY, OF WILMINGTON, DELAWARE, A CORPORATION OF DELAWARE

EDGE-SEALED ASSEMBLY

Application filed June 16, 1928. Serial No. 285,943.

This invention relates, in general, to edge-sealed assemblies, and, in particular, relates to safety glass. While not confined thereto, the invention, as indicated, has more particular application to the art of safety glass and its manufacture, and, therefore, will be described with more particular reference to that art. Safety glass, as will be understood by those skilled in the art, is non-shatterable glass made up of a "sandwich" of two pieces of glass with a sheet of transparent strengthening material, such as cellulose ester plastic, e. g. pyroxylin or cellulose acetate plastic, therebetween, the three units being permanently united together by the central plastic sheet being attached to the glasses by a suitable cement or by direct attachment of the sheet to the glasses. The present invention relates to safety glass having the margin, in the direction of the thickness of the assembly, sealed against the entrance of moisture, etc., between the units of the assembly, and against the evaporation of plasticizer, etc., from the assembly. One object of the invention is to provide an edge-sealed assembly. Another object is to provide an edge-sealed safety glass assembly having the desirable characteristics indicated. Another object is to provide a method for the manufacture of such assemblies. To these ends and also to improve generally upon assemblies and methods of the character indicated, the invention consists in the various matters hereinafter described and claimed.

It is desirable that safety glass has, along all its side edges, a seal for preventing the entrance of moisture between the units of the assembly, and the evaporation of plasticizers, softeners and solvents from the strengthening sheet, and it has been proposed to provide such a seal. The difficulty has been, however, that it has heretofore been necessary to groove the edge of the assembly, in order to furnish a proper place of attachment for the seal, such as a lute of bitumen, rubber, or what not; but the provision of this grooving is expensive and tedious, and, moreover, lutes of the type indicated are not particularly satisfactory at best, since they have a tendency to soften under heat and exude from the crevices, and also have a tendency to wear off from the edges, leaving narrow channels around the edges in which rain may become pocketed.

Distinguished from all this, in general accordance with the present invention, there is used an edge-seal of sprayed or atomized metal. I have found that this metal will permanently adhere to the edge of the assembly, both to the glasses and to the strengthening sheet, not only without the aid of a channel, but even in cases where the central sheet projects beyond the cover sheets. It is impervious to moisture and therefore gives ample protection; it satisfactorily resists abrasion such, for example, as that to which the edges are subjected when door windows in automobiles are raised and lowered in the door channels; it is easily applied at very small cost; it does not make an objectionably noticeable border around the edge of the glass; it is not affected by temperature, and, as mentioned above, satisfactorily serves to keep the moisture out of, and the solvents, etc., in, the sandwich; and it does not require the extra operations of grooving and cleaning out the grooves before applying the seal.

Figure 2:
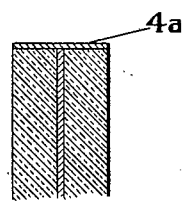
Figure 3:
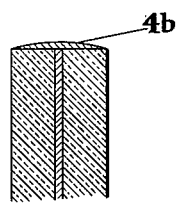
Figure 4:
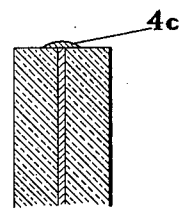

In the accompanying drawings, Figure 1 is a conventional cross-sectional view of safety glass embodying the invention, and Figures 2, 3 and 4 are fragmentary sectional views showing some of the ways in which the sprayed metal seal may be applied to the glass.

Referring now to the drawings, and more particularly to Figure 1, the illustrated embodiment comprises sheets 1 and 2 of glass, a central sheet 3 of strengthening material, and an edge-seal 4 of sprayed metal, which seal, preferably and as will be understood, extends completely along all the edges of the article. The general art of manufacturing safety glass assemblies being well understood, it is deemed unnecessary to describe the same in detail, it sufficing to say that the strengthening sheet is desirably of gelatin or cellulose ester, e. g. cellulose nitrate or cellulose acetate, plastic, attached to the glasses either by direct adherence or by the use of suitable cement; and whatever be the strengthening sheet or the specific method of attachment, it is important that access of moisture be prevented, and in the case of plastics, particularly cellulose ester plastics, wherein solvents and plasticizers are used which should remain in the plastic, evaporation of these materials be prevented.

The edge-seal is of metal permanently and tightly-adherently attached to the edge. Preferably, the edge is of sprayed or atomized metal blown in a molten and finely divided state upon the edge. Various and specific methods of so-applying metal are well-known in the arts and described in various patents, as, for example, U. S. Patents 1,100,602, Morf, June 16, 1914, and 1,128,058, Schoop, February 9, 1915, and various others. The machines and methods used will be found described in the various patents of the art, but, by way of illustration, the particular machine mentioned in Patent 1,100,602 comprises, briefly, a small machine adapted to be held in the hand, and having a compressed-air-driven turbine which, through reduction gearing, feeds wire to a fusing nozzle; in the nozzle a hot flame is maintained, the flame being produced by a mixture of combustible gas and compressed air; and the exhaust from the air turbine leads to the nozzle and produces the atomizing and spraying referred to. In another slightly different method, noted in U. S. Patent 1,299,988, Metzger, April 8, 1919, a metal wire is fed into an oxyacetylene flame, the wire being fed to or through the nozzle of the torch providing the flame; and the metal becomes melted at the tip of the torch and is projected against the object to be coated by means of high pressure gas. Whatever the specific process, the metal, as tin, is melted and divided into fine particles, as atomized, and deposited in a thin layer just as it chills, upon the edge of the sandwich. Various metals may, of course, be used for the purpose, nearly all metals being sufficiently fluid at suitable temperatures to produce fine subdivision and no difficulty being found in working with them, but some metals, such as zinc and aluminum, require the use of fluxes, or other metals, in small quantities, as mentioned in Patent 1,128,058, supra.

The metal coating may be of any thickness desired, and a coating of a few thousandths of an inch is generally satisfactory, having regard not only for the protection desired, but also for the wearing qualities. It is desirable, for appearance sake, that the coating does not extend on to the faces of the glasses. The seal may be of any configuration desired. In Figure 2 is illustrated a seal 4ª which is substantially rectangular in cross-section and extends from face to face of the assembly. In Figure 3, at 4ᵇ, is shown a seal which extends from face to face of the assembly, but is arc-shaped in cross-section. In Figure 4 is shown a seal 4ᶜ which is arc-shaped in cross-section, but does not extend from face to face of the assembly, although it covers the edge of the strengthening sheet 3 and overlaps onto the edges of the glasses. It will be understood, of course, that many other shapes for the seal may be adopted without departing from the invention.

Although the invention has been described with more particular reference to safety glass comprising a "sandwich" of three units, it will be understood that it is applicable also to sandwiches comprising any number of units. Furthermore, although the invention has been described with particular reference to safety glass, it will be understood that other assemblies may be edge-sealed in general accordance with the invention.

I claim:

1. A safety glass sandwich comprising a pair of glasses and a strengthening sheet therebetween, the edges of said sandwich being coated with a metal whereby to effectively seal the same against entrance and exit of vapors.

2. A safety glass sandwich comprising a pair of glasses and a strengthening sheet therebetween, the edges of said sandwich being coated with a thin film of metal whereby to effectively seal the same against entrance and exit of vapors.

3. A safety glass sandwich comprising a pair of glasses and a strengthening sheet therebetween, the edges of said sandwich being coated, in their normal condition and without special adaptation, with a thin film of metal whereby to effectively seal the same against entrance and exit of vapors.

4. Safety glass having its edges highly wear-resistant and sealed against the entrance of moisture to, and the evaporation of solvent from, the hereafter named strengthening sheet, said safety glass comprising a pair of glasses, a central cellulose ester strengthening sheet, permanently attached together, and a seal of sprayed metal, overlying the edge of the strengthening sheet and extending onto the edges of the glass sheets, thereby to seal the strengthening sheet.

5. The method of making safety glass which comprises assembling a pair of glasses and a strengthening sheet therebetween, permanently attaching the glasses and sheet together, and spraying metal along the edge of the assembly to overlie the edge of the strengthening sheet.

In testimony whereof, I affix my signature.

FRANCIS B. DAVIS, Jr.